(12) United States Patent
Tsang

(10) Patent No.: US 7,930,270 B2
(45) Date of Patent: Apr. 19, 2011

(54) MANAGING FILES ON MULTIPLE COMPUTING DEVICES

(75) Inventor: Michael Tsang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 322 days.

(21) Appl. No.: 11/710,800

(22) Filed: Feb. 26, 2007

(65) Prior Publication Data

US 2008/0208870 A1    Aug. 28, 2008

(51) Int. Cl.
*G06F 17/00* (2006.01)
(52) U.S. Cl. ........................ 707/610; 709/200
(58) Field of Classification Search .................... 709/200
See application file for complete search history.

(56) References Cited

U.S. PATENT DOCUMENTS

| | | | |
|---|---|---|---|
| 6,023,706 | A | 2/2000 | Schmuck et al. |
| 6,571,245 | B2 | 5/2003 | Huang et al. |
| 6,938,042 | B2 * | 8/2005 | Aboulhosn et al. ............. 707/10 |
| 6,947,940 | B2 | 9/2005 | Anderson et al. |
| 7,165,096 | B2 | 1/2007 | Soltis |
| 2004/0172423 | A1 * | 9/2004 | Kaasten et al. ............... 707/201 |
| 2005/0050067 | A1 | 3/2005 | Sollicito et al. |
| 2005/0091289 | A1 | 4/2005 | Shappell et al. |
| 2005/0091595 | A1 * | 4/2005 | Shappell et al. ............... 715/700 |
| 2005/0262371 | A1 | 11/2005 | Luke |
| 2005/0273486 | A1 | 12/2005 | Keith |
| 2006/0004765 | A1 | 1/2006 | Anderson et al. |
| 2006/0041527 | A1 | 2/2006 | Fessler |
| 2006/0129627 | A1 * | 6/2006 | Phillips et al. ................ 709/200 |
| 2006/0173932 | A1 | 8/2006 | Cortright et al. |
| 2006/0242206 | A1 * | 10/2006 | Brezak et al. ................. 707/201 |
| 2006/0248040 | A1 | 11/2006 | Tolvanen et al. |

OTHER PUBLICATIONS

International Search Report, PCT/US2008/052234, Dated: May 22, 2008, pp. 1-11.
Corwin Chris Walks, "Pervasive Computing: The Evolution of Accessibility to Information", http://faculty.ed.umuc.edu/~meinkej/inss690/walks.pdf, Mar. 2002.
Perry, et al., "Dealing with mobility: understanding access anytime, anywhere",Date: Dec. 2001, pp. 323-347, vol. 8 , Issue 4, http://portal.acm.org/citation.cfm?id=504707&dl=ACM&coll=GUIDE&CFID=11111111&CFTOKEN=2222222.

* cited by examiner

*Primary Examiner* — Charles Kim
*Assistant Examiner* — Anteneh Girma

(57) ABSTRACT

The present technique provides a combined file space for files from multiple partner computing devices. An individual cache policy associated with each partner computing device determines the manner in which the files in the combined file space are filtered for the respective partner computing device. Files data that do not have content stored locally have metadata associated with the files stored locally in the combined file space.

20 Claims, 11 Drawing Sheets

MANAGING FILES ON MULTIPLE COMPUTING DEVICES

BACKGROUND

There are numerous types of computing devices to use and own. The computing devices range from mobile devices to traditional desktop computing devices. Typically, an individual may use several different types of computing devices daily. For example, an individual may have a desktop computing device at work for creating and storing work-related information. The same individual may also have a laptop computer and/or personal digital assistant for viewing work-related information when the individual is away from the office.

One of the problems with using multiple computing devices is managing the data that resides on each computing device. If the individual manually manages these files, each computing device may have duplicate data files. These duplicate data files may then be updated individually, which results in version conflicts. The individual must then manually resolve these version conflicts. Thus, managing user data in this manner becomes tedious and time consuming.

An alternate approach for managing user data on multiple computing devices links a set of folders on each of the multiple computing devices and duplicates the files within each set on each computing device. However, because mobile devices generally are not as powerful as desktop computing devices and typically have less memory, these computing devices may not have sufficient storage space to replicate all the files in the linked set of folders. When this occurs, an individual will be unaware that certain files are not accessible. In addition, this approach requires the individual to carefully plan how the files should be organized in the linked set of folders.

Thus, these current techniques for managing data on multiple computing devices are not ideal. An adequate technique has eluded those skilled in the art, until now.

SUMMARY

Described herein, among other things, are implementations of various technologies and techniques for managing files on multiple computing devices. In these implementations, a combined file space is used to view files from multiple computing devices that have been designated as partner computing devices. An individual cache policy associated with each partner computing device determines the manner in which the files in the combined file space are filtered for the respective partner computing device. Files that do not have content stored locally in the combined file space have metadata associated with the file stored locally in the combined file space.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Many of the attendant advantages of the present technique will become more readily appreciated as the same becomes better understood with reference to the following detailed description. A description of each drawing is briefly described here.

Embodiments of the present infrastructure and technique for managing files on multiple partner computing devices will now be described in detail with reference to these Figures in which like numerals refer to like elements through-out.

DETAILED DESCRIPTION

The following discussion first describes an operating environment in which a combined file space is utilized to manage files from multiple computing devices configured as partner computing devices. Next, the discussion focuses on file management components that may reside on one or more of the partner computing devices and that are configured to manage files in the combined file space of each partner computing device. The discussion then describes an example for several processes suitable for implementing the file management components. Lastly, the discussion describes one embodiment for a partner computing device However, before describing the above items, it is important to note that various embodiments are described fully below with reference to the accompanying drawings, which form a part hereof, and which show specific implementations for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation, or an implementation combining software and hardware aspects. The following detailed description is, therefore, not to be taken in a limiting sense.

In various embodiments, the logical operations may be implemented (1) as a sequence of computer implemented steps running on a computing device and/or (2) as interconnected machine modules (i.e., components) within the computing device. The implementation is a matter of choice dependent on the performance requirements of the computing device implementing the embodiment. Accordingly, the logical operations making up the embodiments described herein are referred to alternatively as operations, steps, or modules.

Operating Environment for Multiple Partner Computing Devices

Figure 1:
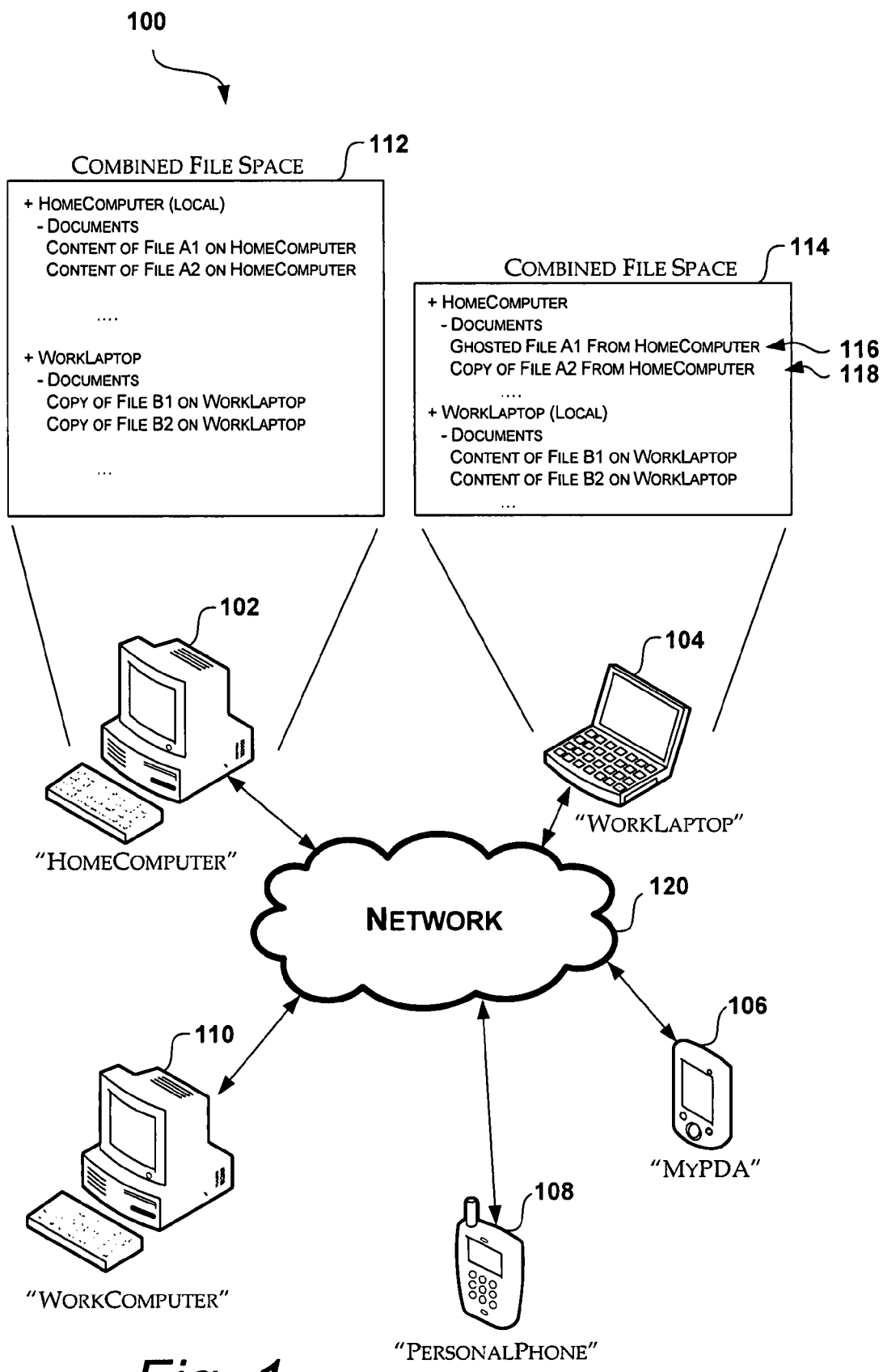
FIG. 1 is a graphical illustration of an operating environment in which multiple partner computing devices utilize a respective combined file space to manage files from the partner computing devices.

FIG. 1 is a graphical illustration of an operating environment 100 in which multiple partner computing devices 102-110 are configured to manage files from various partner computing devices via a respective combined file space (e.g., combined file space 112). Hereinafter, the abbreviated term "partner" may be used interchangeably with the term "partner computing device". The term "local" is used to modify a partner computing device (i.e., "local partner computing device) and a combined file space (i.e., local combined file space") to indicate that the partner computing device is associated with that particular combined file space.

Each partner computing device 102-110 includes a respective combined file space. For simplicity, FIG. 1 only illustrates the combined file space for partner computing devices 102 and 104. Partner computing device 102 includes combined file space 112 and partner computing device 104 includes combined file space 114.

In overview, allocated storage space for a combined file space may differ among the partners. For example, the combined file space associated with a desktop computing device may be larger than the combined file space on a personal digital assistant. However, the combined file space on each of the partner computing devices identifies a set of shared files from each partner. Thus, the combined file space on each partner provides the same view of the shared files in any of the combined file spaces on any of the partner computing devices. In order to provide the same view of the shared files in a combined file space with limited space, the combined file space may include a "ghosted file" (e.g., ghosted file 116) instead of actual content (e.g., content 118) for the associated file. As will be described in greater detail below in conjunction with FIG. 2, each file in the combined file space may be a one of several states. One of those states may be a ghosted state. Files in the combined file space that are in the "ghosted" state are referred to as "ghosted files". Ghosted files do not have content of the file stored in the local combined file space, but rather have metadata associated with the file stored in the local combined file space on the local partner computing device. The metadata allows users to search for files whose content is not stored locally even when the local partner computing device is offline. However, the content for the ghosted files will not be available until the local partner computing device is online and the content is available from one of the other partner computing devices.

The partner computing devices may communicate via a network 120, such as a local area network, wireless network, wide area network, cellular network, Internet, or the like. Each partner computing device may have a unique identifier that identifies the partner computing device as a partner for a specific account (not shown). The unique identifier may be a friendly name (e.g., "HomeComputer"), a GUID, or any other mechanism for uniquely identifying a partner computing device. The account may be associated with one computer user, a group of related computer users, or the like. A local or Internet-oriented discovery and authentication mechanism may be used to authenticate a partner computing device and to discover the other partners associated with the account.

Figure 2:
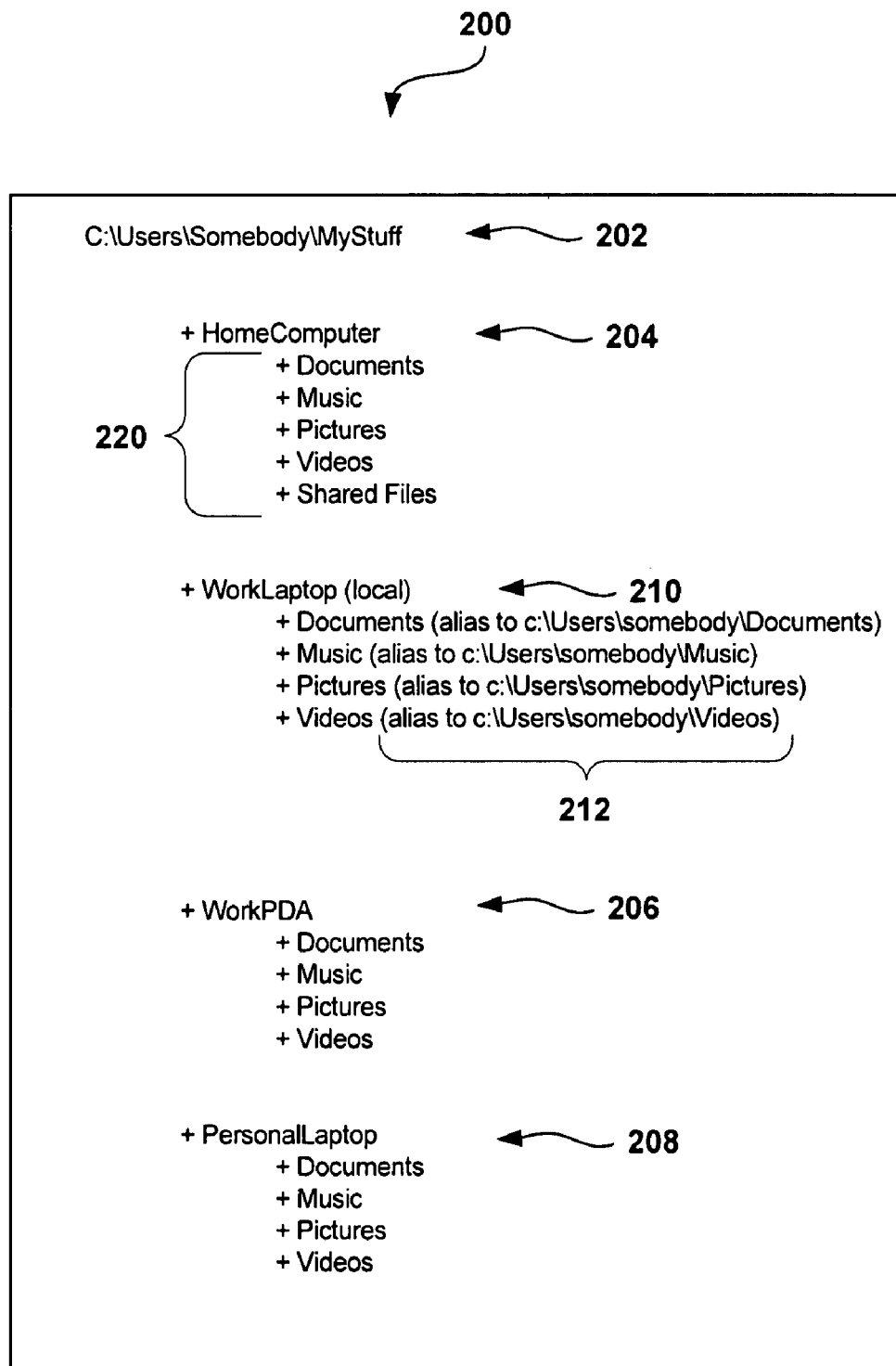
FIG. 2 depicts an example of an organizational structure for a combined file space used in a partner computing device shown in FIG. 1.

FIG. 2 depicts an example of an organizational structure that can be used to implement a combined file space in a partner computing device shown in FIG. 1. In this example implementation, the combined file space is represented by a folder 202 located in a pre-determined location, such as in a user's login root folder. The pre-determined location may be obtained from a registry or through any other means for designating the pre-determined location. A partner sub-folder (e.g., sub-folders 204-208) is associated with each partner other than a local partner. The partner sub-folder represents a root of each partner's file space. A local sub-folder (e.g., local sub-folder 210) is associated with a local file space on the local partner computing device. Mount points 212 alias local folders to the combined file space. As known to those skilled in the art, mount points 212 provide a mechanism that overcomes the limitation of using only drive letters to refer to directories and allows a more logical organization of files and folders. The mount points may be automatically created to alias known local folders or may be created by the user to alias local folders or remote folders on the network. In one embodiment, a default set 220 of sub-folders for each partner may be created. The default set 220 may identify known folders in a user file space and may be operating system specific.

Figure 3:
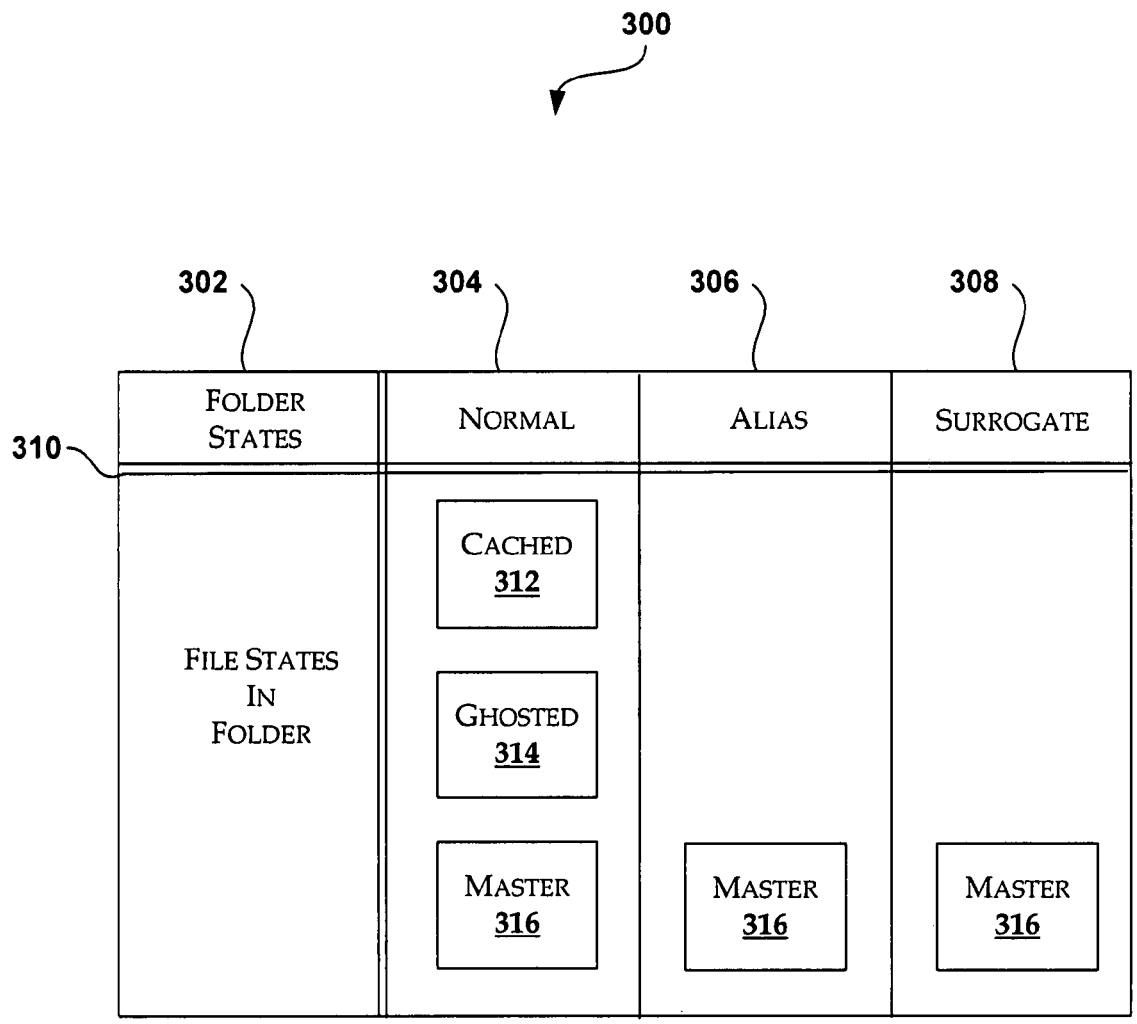
FIG. 3 is a table that illustrates an example of several states that may be associated with files and folders in the combined file space shown in FIG. 1.

FIG. 3 is a table that illustrates an example of several states that may be associated with files and folders in the combined file space shown in FIG. 1. In this example, there are three folder states 302: a normal folder state 304, an alias folder state 306, and a surrogate folder state 308. The normal folder state 304 refers to a local folder on a local partner computing device. The alias folder state 306 points to a folder on the local partner computing device that is located outside of the combined file space. The alias folder in the combined folder space is a mount point for the actual folder on the local partner computing device. The surrogate folder state 308 refers to a folder in the combined file space that represents an actual folder on a computing device that is accessible to the local partner computing device via network 120 in FIG. 1. Hereinafter, a computing device accessible to a local partner computing device is referred to as a remote computing device. Surrogate folder states may identify files located on a public server that a user does not own. By making the folder a surrogate folder, the files can be included in the user's combined file space on the local partner computing device. In one embodiment, the surrogate folder state may not be associated with a folder on a remote computing device that does not have constant connectivity, such as a wireless network. In addition, in a further refinement, a file system of an operating system on the remote computing device may support change notifications in a manner that identifies when file system objects have been added, deleted, or modified. This helps identify the shared files that possibly need to be updated in the combined file space.

Continuing with these example file and folder states, a file in the combined file space may be one of three file states 310: a cached file state 312, a ghosted file state 314, and a master file state 316. The master file state 316 refers to an actual file that resides on the local partner computing device. The cached file state 312 represents a master file on a remote partner computing device whose content is cached locally on the local partner computing device. A ghosted file state 314 represents a master file on a remote partner computing device whose content is not cached locally on the local partner computing device but instead has metadata associated with the master file stored locally on the local partner computing device. A ghost stub may contain the metadata associated with the master file.

The normal folder 304 may have files with any of the three file states: cached file state 312, ghosted file state 314, and master file state 316. The alias folder 306 and surrogate folder 308 may have files with the master file state 316. For convenience, a file in one of the three file states may be referred to by that state. For example, a file having a ghosted file state may be referred to as a "ghosted" file. In one embodiment, every file in the combined file space has one master copy (i.e., local file) on one of the partner computing devices and potentially multiple cached copies across different remote partner computing devices. For each partner computing device associated with an account, the files located in the local file space are master files and files in other folders in the combined file space are either cached files or ghosted files.

Components for One of the Partner Computing Devices

Figure 4:
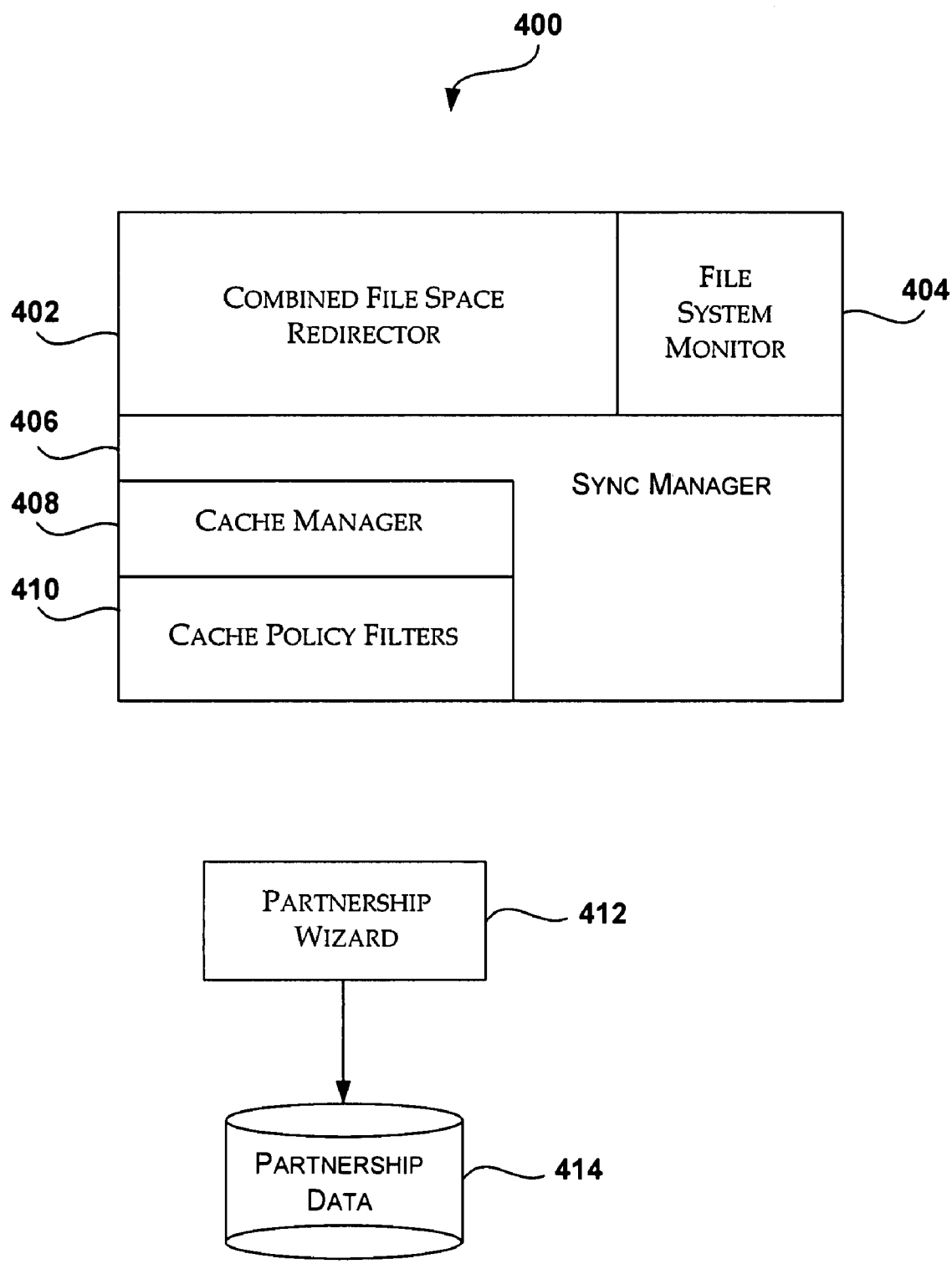
FIG. 4 is a functional block diagram generally illustrating several file management components that may reside on one or more of the partner computing devices shown in FIG. 1 and that manage the shared files among the multiple partner computing devices.

FIG. 4 is a functional block diagram generally illustrating several file management components that may reside on one or more of the partner computing devices shown in FIG. 1 and that manage the shared files on the multiple partner computing devices. The file management components 400 include a combined file space redirector 402, a file system monitor 404, a sync manager 406, a cache manager 408, and cache policy filters 410. One skilled in the art will appreciate that the processing steps performed by any one of the components may be performed by another component. Thus, FIG. 4 illustrates one possible arrangement of the file management components for managing files among multiple partner computing devices.

In overview, the combined file space redirector 402 provides a combined file space for files from multiple computing devices. The file system monitor 404 monitors activities on the files in the combined file space, such as file creation, file deletion, renaming file, or the like. When the file system monitor detects activity, the file system monitor sends an activity event to the sync manager 406. The sync manager 406 updates a file state for the respective file in the combined file space and keeps track of the file states of the same files across all partner computing devices. The sync manager is also responsible for communicating with partner computing devices for propagating the file changes to other partner computing devices.

The cache manager determines which files to cache locally and which files to "ghost". As mentioned above, ghosted files are files that do not have their content stored locally, but instead, have metadata associated with the file stored locally in the combined file space. The metadata may include any number of items, such as filename, file size, author, title, creation date, last saved, and the like. The metadata may be stored in a ghost stub that is then stored in the combined file space. The metadata supports off-line searching of the files in the combined file space. The files may include any type of file, such as user or application states (e.g., registry) stored in the form of a data file, favorite web links stored as URL files, application data files, program files, and the like.

File management components 400 may further include a partnership wizard 412 that configures a partner computing devices that uses a combined file space. The configuration data created by the partnership wizard component 412 is stored as partnership data 414.

Figure 5:
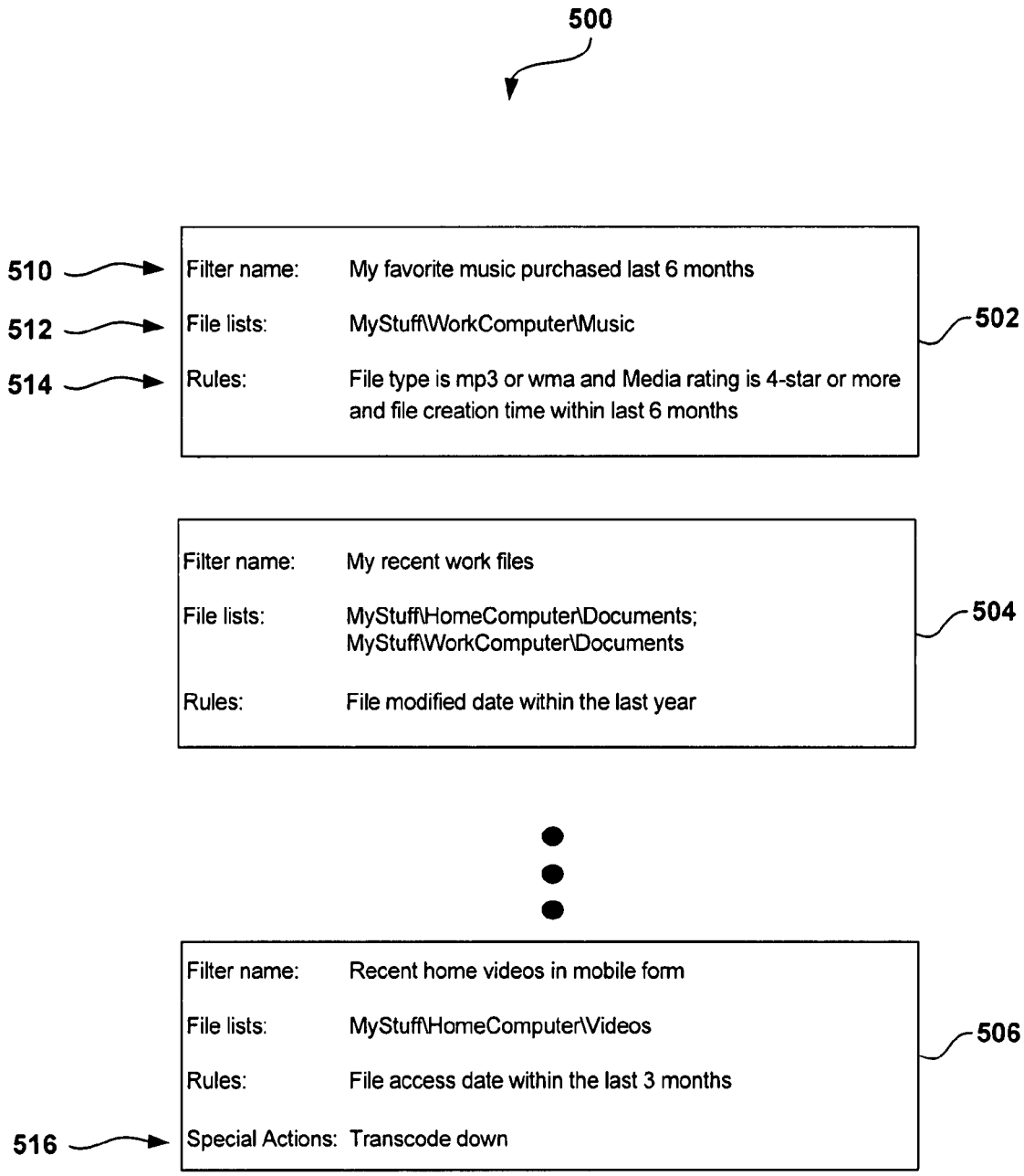
FIG. 5 illustrates several examples of cache policy filters that help determine which state to associate with a file in the combined file space.

FIG. 5 illustrates several examples of cache policy filters that help determine which state to associate with a file in the combined file space. The cache policy filters may take various forms, such as a data structure, text, or the like One will note that different partner computing devices will most likely have different cache policy filters. In part, this is due to the fact that different partner computing devices may have different storage capabilities. On any partner computing device, it is difficult to cache every file in the combined file space locally. Cache policy filters 410 illustrated in FIG. 4 includes multiple cache policy filters and a cache policy priority list.

For the example cache policy filters, each cache policy filter may include a filter name 510, file lists 512, and filter rules 514. The filter name 510 uniquely identifies one of the cache policy filters. The file list 512 identifies one or more folders that contain files upon which the cache policy filter is applied. The filter rules 514 identify criteria for filtering the files. The filter rules may be from several categories, such as file type, temporal rules, file size, and the like. For example, the filter rules may include "file modified date within the last year", "file access date within the last 3 months", and the like. The filter rules 514 may also be specified as "None" if each of the files is desired to be stored locally. In a further refinement, each policy filter may include a special action 516 that identifies certain actions to perform on the file. For example, the special action may be "transcode down" which is useful to cache large media files to partner mobile computing devices that do not have a large storage capacity. The above filter rules illustrate some example filter rules and are not exhaustive. Many other filter rules are envisioned as cache policy filters.

In addition, to user-defined cache policy filters, a set of built-in cache policy filters may be provided. The user-defined cache policy filters and the set of built-in cache policy filters may be prioritized into a priority list. Using the example policy filters 502-506 shown in FIG. 5, the priority list may be as follows: 1) My recent work files; 2) My favorite music purchased last 6 months; and 3) Recent home video in mobile form. As will be described below, for each cache policy filter, the cache manager applies the filter rules to a combined work space to create a filtered file list. Multiple file lists may then be concatenated based on priority and used to populate the local combined file space up to the assigned storage capacity. Files with lower priorities that do not fit in the storage capacity are ghosted.

In another embodiment, the cache manager may allow third parties to register a plug-in for filter rules so that rules can be created for specific third party files. For example, a third party could register the following two filter rules: 1) File type is MIDI and MIDI format is Type 1; and 2) File type is PDF and Author is Tom Doe.

Example Processes Suitable for Implementing the Components

The following flow diagrams provide example processes that may be used to implement the file management components shown in FIG. 4. The order of operations in these flow diagrams may be different than described and may include additional processing than shown. In addition, not all of the processing shown in the flow diagrams need to be performed to implement one embodiment for managing files from multiple computing devices.

Figure 6:
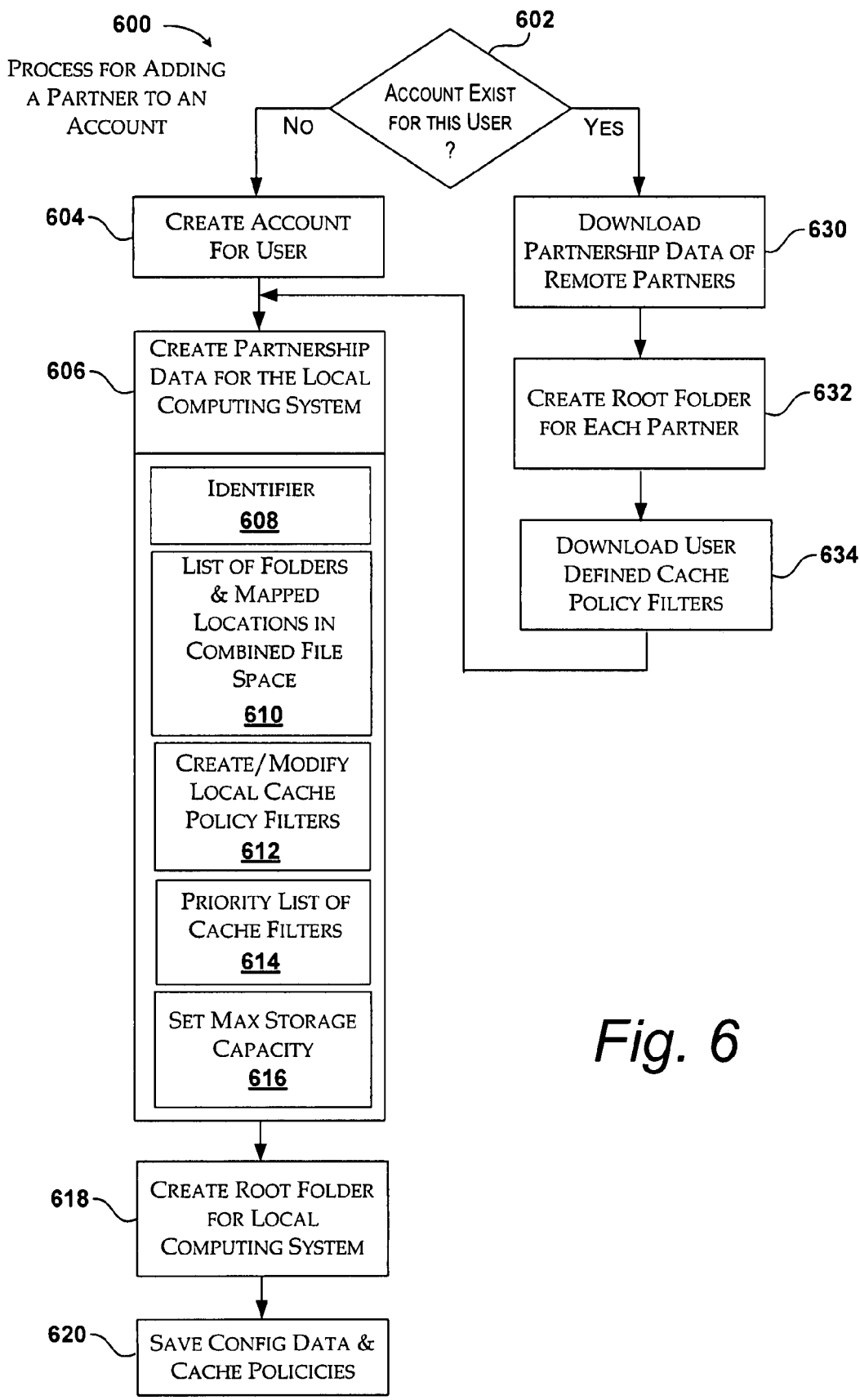
FIG. 6 is a flow diagram illustrating one embodiment of a process for creating partnership data, shown in FIG. 4, for one of the partner computing devices shown in FIG. 1.

FIG. 6 is a flow diagram illustrating one embodiment of a process 600 for creating partnership data that occurs when a partner computing device is added to an account. Process 600 begins at decision block 602, where a determination is made whether the partner computing device is already associated with an account. The first time that process 600 is executed for a particular partner computing device for a specific user of the partner computing device, processing continues at block 604.

At block 604, an account is created. The account identifies each partner computing device that wishes to share files among the other identified partner computing devices. Each account includes partnership data for each partner computing device where the partnership data includes configuration data and cache policy filters. Processing continues at block 606.

At block 606, partnership data is created for the partner computing device which initiated process 600. In one embodiment, a user interface element may be displayed for inputting the partnership data. However, various mechanisms may be used to generate the partnership data. At block 608, a name identifying the partner computing device may be input. The name may be a friendly name, a GUID, or the like. At block 610, a list of local folders may be identified. The list identifies the folders to include (i.e., "share") in the combined file space and their corresponding mapped locations. By default, the list of folders may automatically include known folders that exist on the partner computing device. For example, "Documents", "Music", "Pictures", and "Videos" may be automatically mapped into the combined file space. As one skilled in the art will appreciate, these known folders may be dependent on the operating system running on the partner computing device and may differ between operating systems.

At block 612, one or more cache policy filters may be created or cache policy filters may be modified. The cache policy filters associated with the local partner computing device may include a set of built-in cache policy filters. In addition, sophisticated users may create their own additional cache policy filters. Process 600 may provide a user interface for creating cache policy filters, may read a file to create the cache policy filters, or provide any other mechanism to create cache policy filters.

At block 614, a prioritized list of cache policy filters may be identified. The priority list is a ranking of the policy filters. The user can add or remove policy filters in the list as well as rearrange the priority order of the filters. At block 616, a maximum storage capacity for the combined file space may be set. The maximum storage capacity may be set by a user of the local partner computing device or may be automatically set based on one or more criteria. For example, the maximum storage capacity may be calculated based on a total free storage space available on the partner computing device. In addition, other automated techniques based on other criteria are envisioned to determine the maximum storage size. The maximum storage capacity determines the size of the combined file space. Processing continues at block 618.

At block 618, a sub folder for the local partner computing device is created. In one embodiment, the sub folder may be created in the user's login root folder (e.g., c:\Users\somebody\MyStuff or c:\Documents and Settings\somebody\MyStuff). One will note that the user's login root folder is dependent upon the operating system of the computing device. In another embodiment, a pre-determined location may be created for specifying a location of the sub folder. The pre-determined location may then be used to determine where to add the sub folder for each of the partner computing devices. Processing continues at block 620.

At block 620, the configuration data and the local cache policies are saved. In one embodiment, the configuration data and cache policy filters are saved locally and on-line. In addition, the configuration data and the cache policy filters may be replicated and saved on each partner computing device associated with the account.

If an account already exists and a user wants to add a new partner computer device to the account, processing continues from decision block 602 to block 630. At block 630, the partnership data for partners associated with the account are downloaded. At block 632, a sub folder is created for each partner identified in the downloaded partnership data. At block 634, user defined cache policy filters that were saved by partner computing devices may be downloaded to be used by block 614 for setting local cache policy. Processing then continues at block 606 as described above. One will note, at block 612, the downloaded user defined cache policy filters may be added to create the cache policy for the local partner computing device.

Process 600 may also include partnership maintenance tasks, such as deleting a partner, changing cache policy of the local machine, adding or deleting mappings in the local combined file space, or changing the storage capacity for the combined file space. While these maintenance tasks are not shown individually in FIG. 6, one skilled in the art will appreciate that blocks illustrated in FIG. 6 may be run separately. For example, block 612 may be executed separately to modify local cache policy filters and block 616 may be executed separately to modify the maximum storage capacity for the local combined file space.

Figure 7:
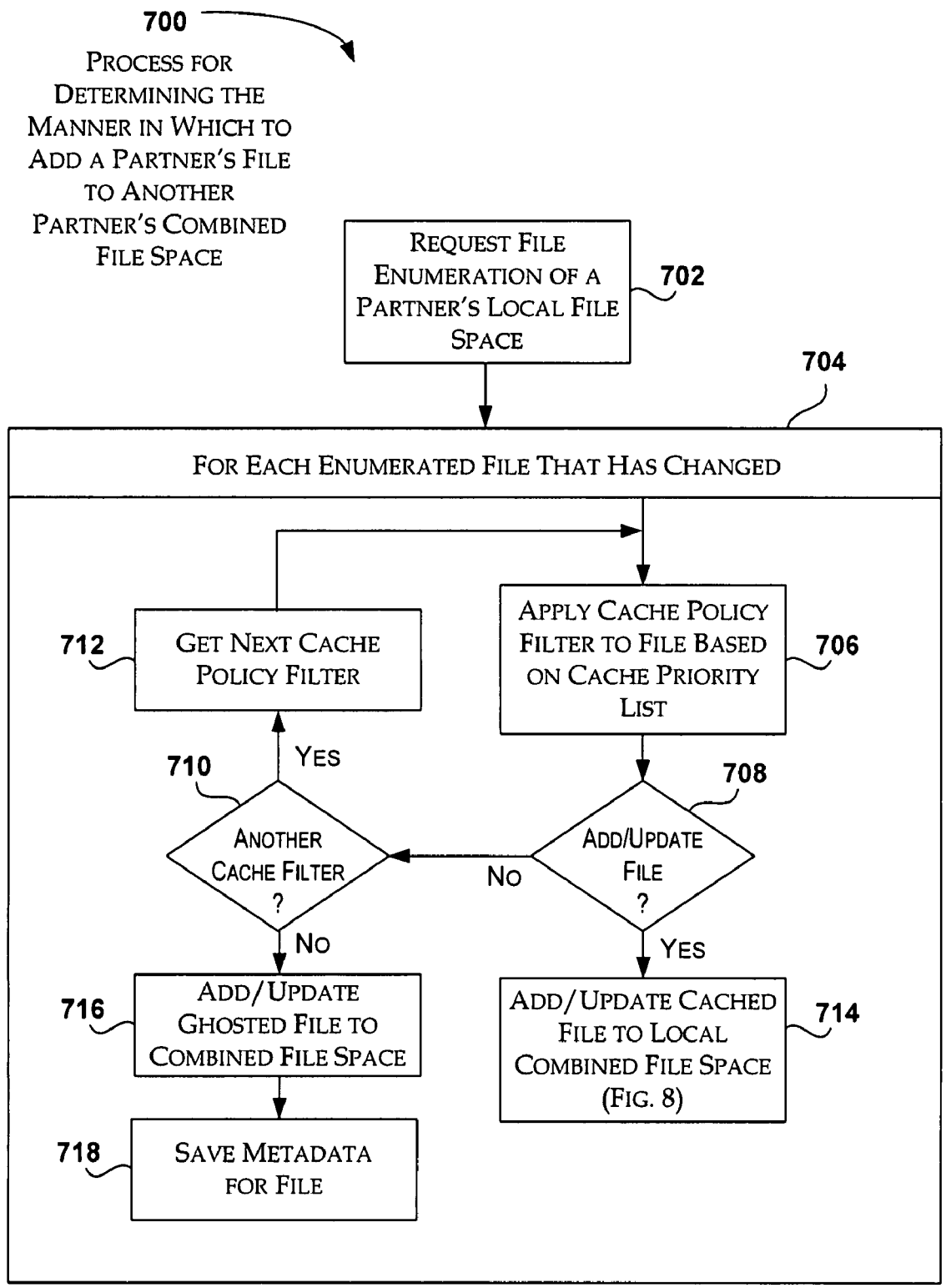
FIG. 7 is an operational flow diagram illustrating one embodiment of a process for applying cache policy filters to determine the manner in which a file designated for sharing by one partner computing device is added to the combined file space on another partner computing device.

FIG. 7 is an operational flow diagram illustrating one embodiment of a process 700 for applying cache policy filters to determine the manner in which a file designated for sharing is added to the combined file space on a partner computing device. Process 700 may occur when a local partner computing device is added as another partner to an account. In addition, process 700 may be performed by a partner computing device upon coming on-line after being off-line for a period of time. The partner computing device coming on-line may request a file enumeration for each partner computing device associated with the account. Process 700 begins at block 702 where a request to enumerate files for a partner's local file space is received. Processing continues at block 704.

At block 704, for each enumerated file that has changed or is new, blocks 706-718 are performed. At block 706, a cache policy filter is selected based on the cache filter priority list described above and is applied to an enumerated file. At decision block 708, a determination is made whether the file should be added/updated based on the cache policy filter. If it is determined that the file should not be added/updated, processing continues at decision block 710.

At decision block 710, a determination is made whether there are any more cache policy filters in the filter priority list. If there is another cache policy filter, processing continues at block 712 where the next cache policy filter is obtained. Processing then loops back to block 706 and continues as described above. If all the cache policy filters have been applied, at decision block 710, processing continues at block 716 where the file is added/updated as a ghosted file. Adding/updating the file as a ghosted file involves obtaining metadata about the file and storing the metadata (block 718) in the combined file space instead of storing the contents of the file in the combined file space.

At decision block 708, if it is determined that the file should be added/updated, processing continues at block 714. The process for adding/updating a file to the combined file space is illustrated in FIG. 8.

Figure 8:
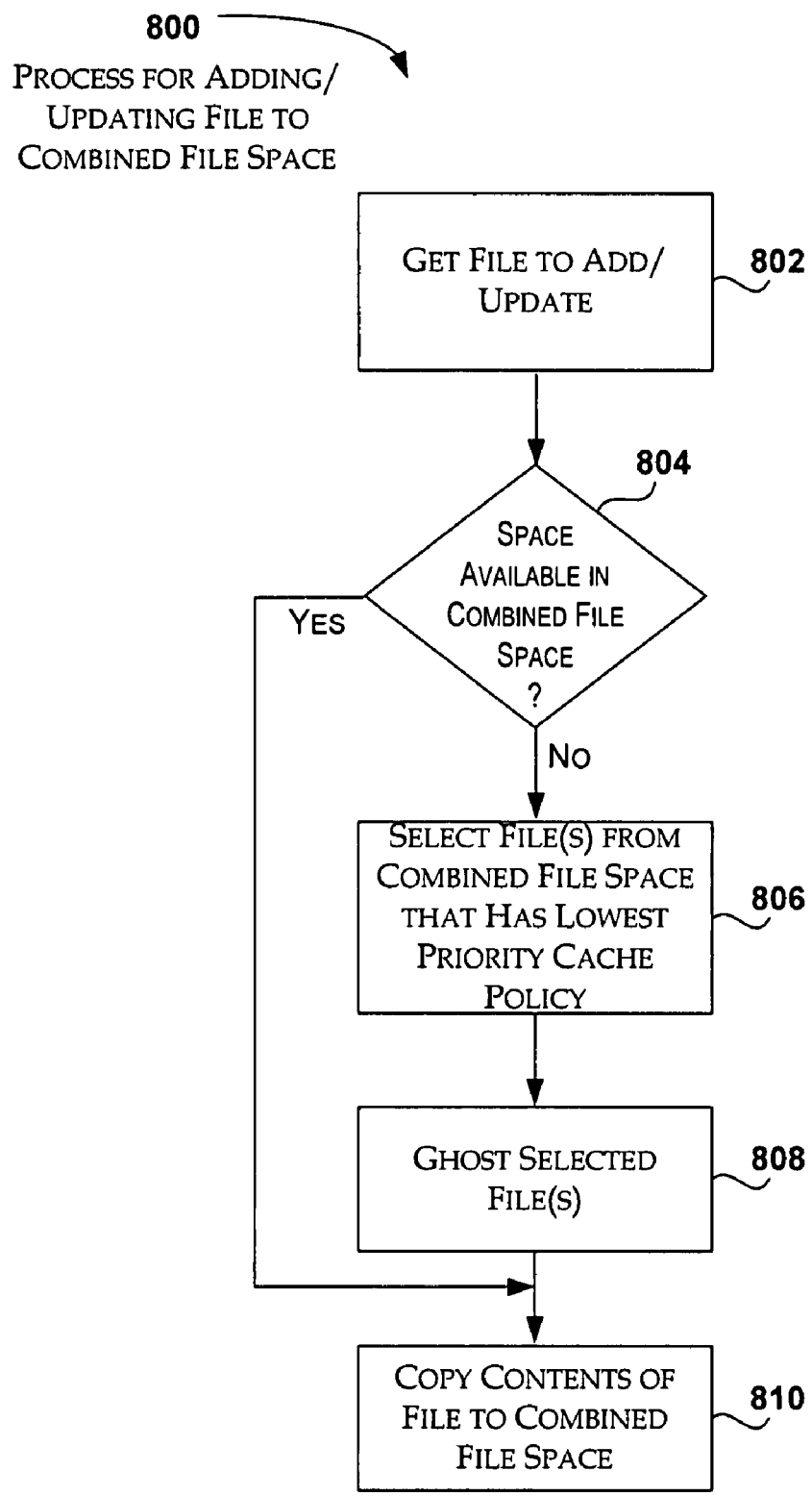
FIG. 8 is an operational flow diagram illustrating one embodiment of a process for adding or updating a file in one of the combined file spaces shown in FIG. 1.

FIG. 8 is an operational flow diagram illustrating one embodiment of a process 800 for adding or updating a file to a combined file space. Process 800 begins at block 802 where the file to be added/updated is obtained. Processing continues at decision block 804.

At decision block 804, a determination is made whether adding/updating the file would exceed the storage space for the combined file space. One will note that a user may set the size of the storage space or may accept a default size that may be calculated based on the local computing device's resources. If adding/updating the file will not exceed the maximum storage space, processing continues at block 810 where a copy of the content of the file is stored in the local combined file space. Processing to add/update the file is then complete.

Returning now to block 804, if it is determined that adding/updating the file will exceed the storage capacity of the combined file space, processing continues at block 806, where the combined file list is analyzed to determine one or more files that have the lowest priority cache policy. The one or more files may then be selected to be ghosted. In another embodiment, multiple files may be selected which, when combined, total a pre-determined capacity. By selecting multiple files, the overhead associated with block 806 may be minimized. Processing continues at block 808.

At block 808, the selected file(s) is ghosted. As described above, when a file is ghosted, metadata is stored in the combined file space for the file instead of storing the contents of the file in the combined file space. Then, at block 810, a copy of the content of the file that is to be added or updated is stored in the local combined file space. Process 800 is then complete.

Figure 9:
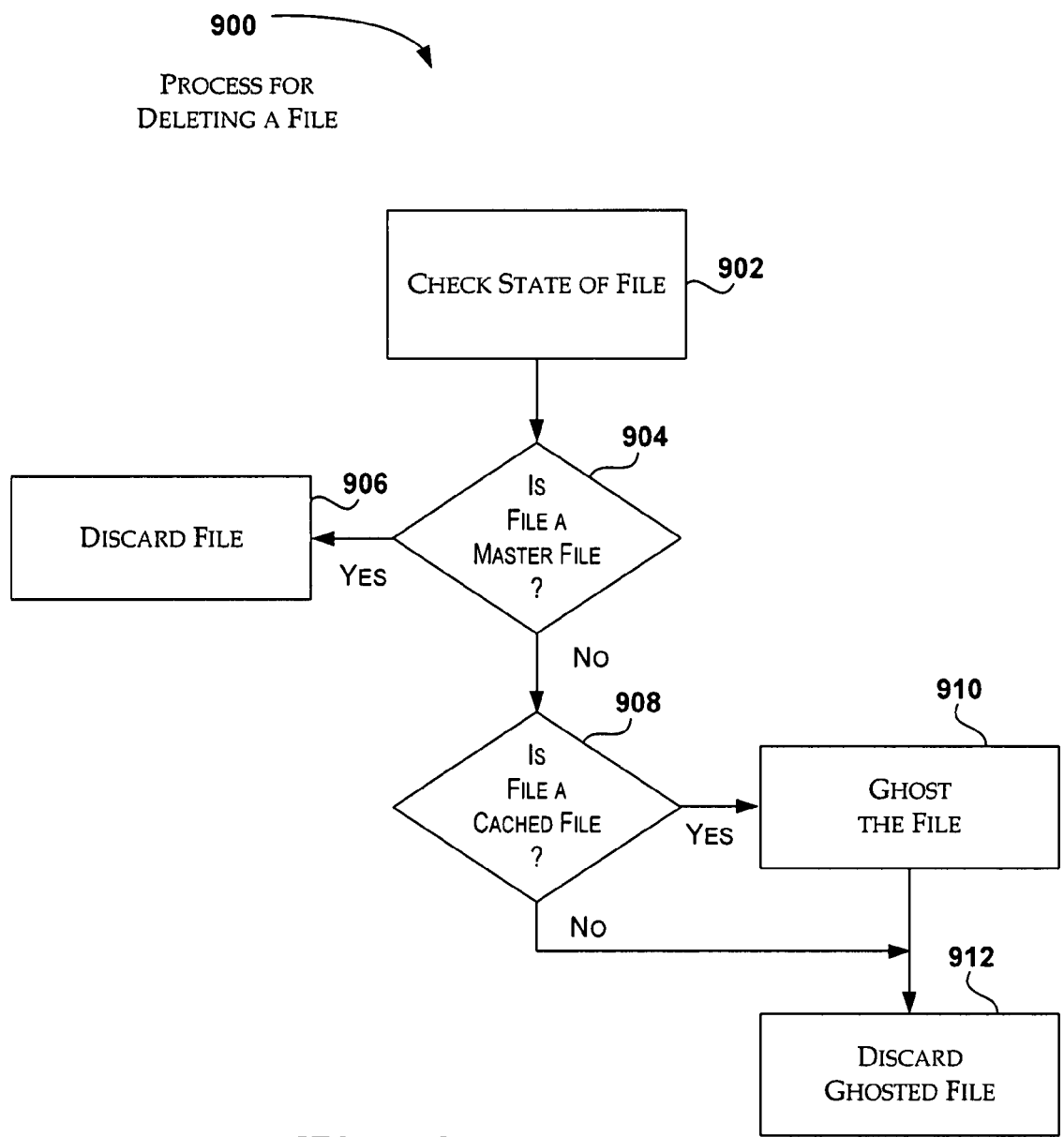
FIG. 9 is an operational flow diagram illustrating one embodiment of a process for deleting a file from one of the combined file spaces shown in FIG. 1.

FIG. 9 is an operational flow diagram illustrating one embodiment of a process 900 for deleting a file in the combined file space. Process 900 begins at block 902 where the state of the file is checked. As mentioned earlier, there are three states for files: cached, ghosted, and master. Processing continues at decision block 904.

At decision block 904, a determination is made whether the file is a master file. If the file is a master file, processing continues at block 906 where the file is discarded. In one embodiment, the file may be discarded by moving the file to the local recycle bin. Processing is then complete. If the file is not a master file, processing continues at decision block 908.

At decision block 908, a determination is made whether the file is a cached file. If the file is a cached file, processing continues at block 910 and 912. At block 910, the cached file is ghosted. At block 912, the ghosted file is discarded. Processing is then complete for the cached file. If the file is not a cached file, the file is a ghosted file and processing continues at block 912 as described above.

One will note that the above process allows recovering files from accidental deletion, but yet does not consume unnecessary space in the combined file system.

Figure 10:
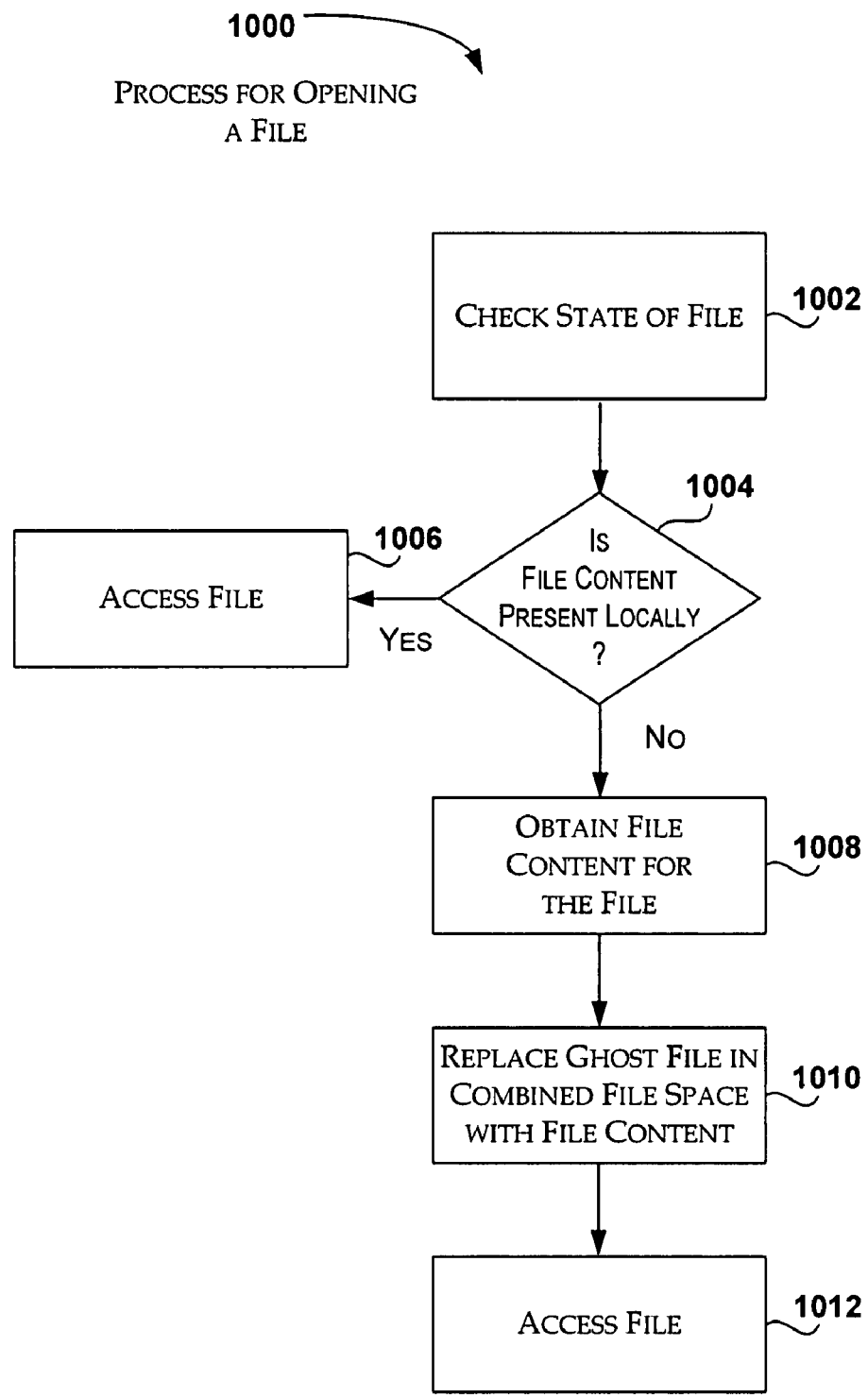
FIG. 10 is an operational flow diagram illustrating one embodiment of a process for opening a file in the combined file space.

FIG. 10 is an operational flow diagram illustrating one embodiment of a process 1000 for opening a file in the combined file space. Process 1000 begins at block 1002 where a state of a file is checked. Again, there are three states for files: cached, ghosted, and master. Files having the cached and master file states have their file content stored locally. Processing continues at decision block 1004.

At decision block 1004, a determination is made whether the content of the file is stored locally. If the content is stored locally, processing continues at block 1006 where the file is accessed and opened. Process 1000 is then complete for this file. If the file content is not present locally, processing continues at block 1008.

At block 1008, the content of the file is obtained. In one embodiment, this is achieved by sending a SendFile request to the partner computing device to get the file content. Processing continues at block 1010.

At block 1010, metadata stored in the combined file space is replaced with the content and the file state is changed to cached. The file can then be accessed at block 1012. Processing is then complete for this file.

One Embodiment for a Partner Computing Device

Figure 11:
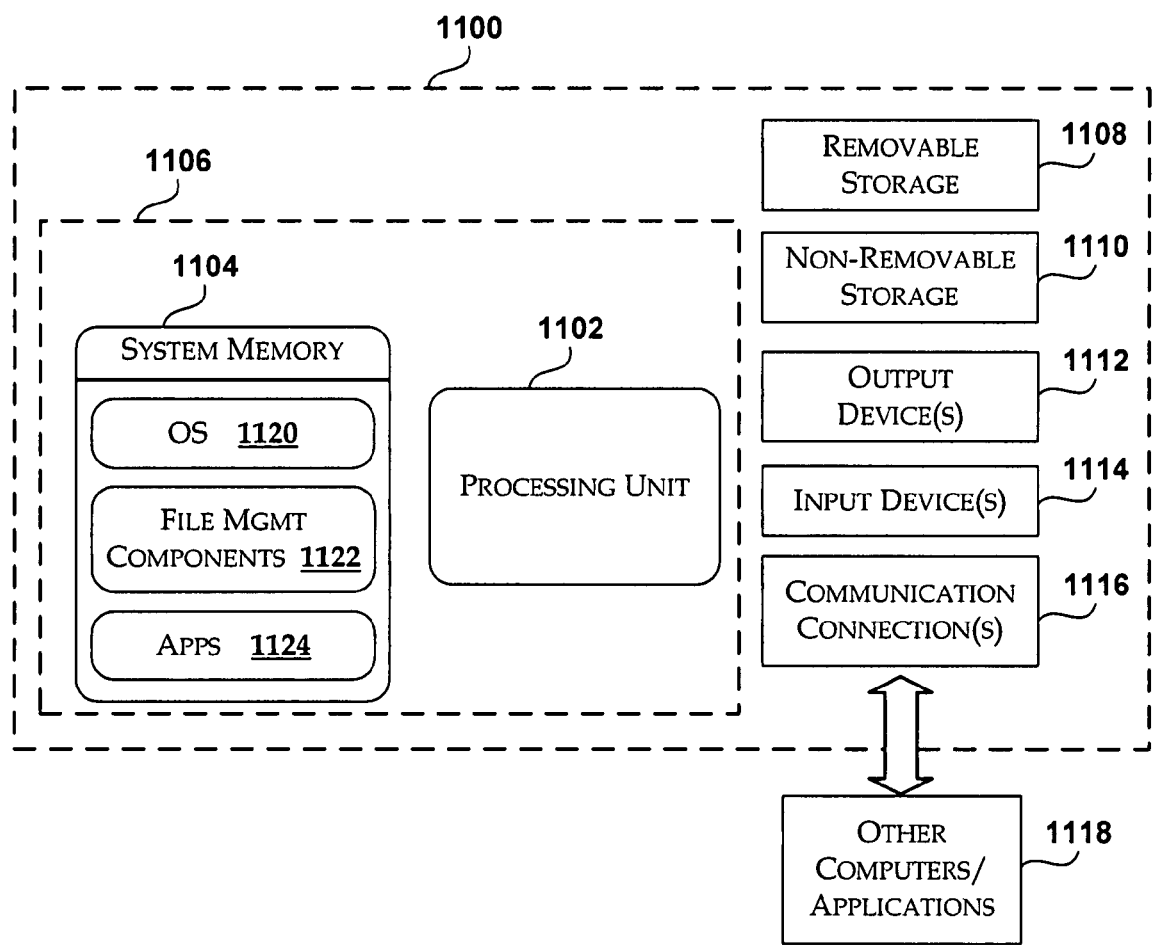
FIG. 11 is a functional block diagram of a partner computing device that may implement the file management components shown in FIG. 4 to manage files on multiple partner computing devices.

FIG. 11 is a functional block diagram of a partner computing device 1100 that may implement one embodiment of the file management components 1122. The partner computing device 1100, in one basic configuration, includes at least a processing unit 1102 and memory 1104. Depending on the exact configuration and type of computing device, memory 1104 may be volatile (such as RAM), non-volatile (such as ROM, flash memory, etc.) or some combination of the two. System memory 1104 typically includes an operating system 1120, one or more applications 1124, and may include program data (not shown). Memory 1104 also includes the file management components 1122. This basic configuration is illustrated in FIG. 11 by dashed line 1106.

Additionally, computing device 1100 may also have other features and functionality. For example, computing device 1100 may also include additional storage (removable and/or non-removable) including, but not limited to, magnetic or optical disks or tape. Such additional storage is illustrated in FIG. 11 by removable storage 1108 and non-removable storage 1110. Computer-readable storage media includes volatile and nonvolatile, removable and non-removable media implemented in any method or technology for storage of information such as computer readable instructions, data structures, program modules or other data. Memory 1104, removable storage 1108 and non-removable storage 1110 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 1100. Any such computer storage media may be part of computing device 1100.

Computing device 1100 includes one or more communication connections 1116 that allow computing device 1100 to communicate with one or more computers and/or applications 1118. Device 1100 may also have input device(s) 1112 such as keyboard, mouse, pen, voice input device, touch input device, etc. Output device(s) 1112 such as a monitor, speakers, printer, PDA, mobile phone, and other types of digital display devices may also be included. These devices are well known in the art and need not be discussed at length here.

The processes described above may be implemented using computer-executable instructions in software or firmware, but may also be implemented in other ways, such as with programmable logic, electronic circuitry, or the like. In some alternative embodiments, certain of the operations may even be performed with limited human intervention. Moreover, the process is not to be interpreted as exclusive of other embodiments, but rather is provided as illustrative only.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage media having computer-executable instructions for managing files on multiple computing devices, the computer-executable instructions, when executed, perform a method comprising:
    establishing an account that identifies a plurality of partner computing devices, the plurality of partner computing devices including a local partner computing device and at least one remote partner computing device, each of the plurality of partner computing devices having a corresponding at least one cache policy filter, each cache policy filter including at least one filter rule;
    providing a combined file space on the local computing device represented by a folder that includes a plurality of sub-folders, each sub-folder being associated with one of the plurality of partner computing devices and being configured to include files shared from the associated one of the plurality of partner computing devices;
    caching contents of a file located on a remote partner computing device in the sub-folder associated with the remote partner computing device in the combined file space if a filter rule of a cache policy filter of the local computing device is met, said caching including storing a copy of the file in the sub-folder associated with the remote partner computing device in the combined file space on the local partner computing device as a cached file, the file located on the remote partner computing device being maintained as a master file; and
    storing metadata associated with the file in the sub-folder associated with the remote partner computing device in the combined file space, instead of storing the contents of the file in the sub-folder associated with the remote partner computing device in the combined file space, if the filter rule is not met.

2. The computer-readable storage media recited in claim 1, wherein the sub-folder associated with the local partner computing device includes a file that is aliased from a local folder on the local partner computing device.

3. The computer-readable storage media recited in claim 1, wherein the criterion is based on an available storage capacity associated with the combined file space.

4. The computer-readable storage media recited in claim 1, wherein establishing the account includes associating a name with the account that is used to log into the account on any of the partner computing devices.

5. The computer-readable storage media recited in claim 4, wherein establishing the account further includes identifying a list of folders and a respective mapped location for each folder in the list.

6. The computer-readable storage media recited in claim 5, wherein establishing the account further includes creating a priority list of a plurality of cache policy filters that are applied to determine whether metadata or content of the file is stored.

7. The computer-readable storage media recited in claim 1, further comprising saving partnership data associated with the account for access by any of the partnership computing devices.

8. The computer-readable storage media recited in claim 1, further comprising synchronizing the user data for one of the partner computing devices when the partner computing device becomes on-line.

9. A computer-implemented method for synchronizing files among a plurality of partner computing devices, comprising:
    applying a filter to a file from a remote computing device, the remote computing device being one of the plurality of partner computing devices, each of the plurality of partner computing devices and a local computing device having a corresponding cache policy defined by at least one cache policy filter, each cache policy filter including at least one filter rule;
    caching the file in a combined file space of the local computing device if the file passes a cache policy associated with the local computing device, the local computing device being one of the plurality of partner computing devices, the combined file space being represented by a folder that includes a plurality of sub-folders, each sub-folder being associated with one of the plurality of partner computing devices and being configured to include files shared from the associated one of the plurality of partner computing devices, said caching including storing a copy of the file in the sub-folder associated with the remote partner computing device in the combined file space on the local computing device as a cached file, the file being maintained at the remote computing device as a master file; and
    storing metadata associated with the file in the sub-folder associated with the remote partner computing device in the combined file space, instead of storing the file in the combined file space of the local computing device, if the file fails the cache policy associated with the local computing device.

10. The computer-implemented method recited in claim 9, wherein the metadata includes a set of information about the file and allows details about the file to be obtained during a search when the local computing device is off-line.

11. The computer-implemented method recited in claim 9, further comprising replacing the metadata with content of the file when a request to open the file is received.

12. The computer-implemented method recited in claim 9, wherein the cache policy comprises a prioritized list of cache policy filters and the file passes the cache policy if the file passes any one of the cache policy filters.

13. The computer-implemented method recited in claim 9, further comprising removing the file from the combined file space if sufficient space is not available in the combined file space for caching another file that has a higher cache priority and replacing the file with metadata associated with the file.

14. A computing device configured to synchronize user data among a plurality of partner computing devices, the device comprising:
   a processor; and
   a memory from which a combined file space is allocated and into which a plurality of instructions are loaded, the combined file space being represented by a folder that includes a plurality of sub-folders, each sub-folder being associated with one of the plurality of partner computing devices and being configured to include files shared from the associated one of the plurality of partner computing devices, each of the plurality of partner computing devices and the computing device having a corresponding at least one cache policy filter, each cache policy filter including at least one filter rule, the plurality of instructions comprising:
   a file system monitor configured to monitor a plurality of activities associated with each of a plurality of files in the combined file space;
   a cache manager configured to determine which of the files are cached and which files are ghosted in the combined file space based on the at least one cache policy filter of the computing device; and
   a sync manager configured to retrieve content associated with one of the files from a remote computing device and to store a copy of the one file in the sub-folder associated with the remote partner computing device in the combined file space as a cached file when the cache manager determines that the one file is to be cached, the one file stored at the remote computing device being a master file, and to retrieve metadata associated with the one file from the remote computing device when the cache manager determines that the one file is to be ghosted instead of retrieving the content associated with the one file from the remote computing device and storing the copy of the one file in the sub-folder associated with the remote partner computing device in the combined file space, the remote computing device being one of the plurality of partner computing devices.

15. The computing device recited in claim 14, wherein the cache manager utilizes a prioritized list of cache policy filters to determine whether the one file is cached or ghosted.

16. The computing device recited in claim 14, wherein when the activity indicates a request to open a ghosted file, the sync manager retrieves content for the ghosted file from an associated remote computing device and the ghosted file is replaced with the content.

17. The computing device recited in claim 14, wherein the combined file space has an hierarchical organizational structure.

18. The computer-readable storage media recited in claim 1, wherein each cache policy filter includes a filter name, a file list, and one or more filter rules.

19. The computer-implemented method recited in claim 9, wherein each cache policy filter includes a filter name, a file list, and one or more filter rules.

20. The computing device recited in claim 14, wherein each cache policy filter includes a filter name, a file list, and one or more filter rules.

* * * * *